(12) United States Patent
Matheson et al.

(10) Patent No.: US 7,516,455 B2
(45) Date of Patent: Apr. 7, 2009

(54) PROBABILISTIC SCHEDULING

(75) Inventors: Caroline Elizabeth Matheson, Cambridge (GB); Marc Shapiro, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 931 days.

(21) Appl. No.: 10/656,355

(22) Filed: Sep. 5, 2003

(65) Prior Publication Data

US 2005/0055179 A1    Mar. 10, 2005

(51) Int. Cl.
G06F 9/46 (2006.01)
G06F 15/173 (2006.01)
G06F 13/00 (2006.01)

(52) U.S. Cl. .................. 718/102; 718/100; 718/104; 709/238; 711/100

(58) Field of Classification Search .............. 718/100, 718/102, 103, 104; 705/7, 8; 709/238; 711/100
See application file for complete search history.

(56) References Cited

U.S. PATENT DOCUMENTS

| | | | | |
|---|---|---|---|---|
| 5,671,361 A * | 9/1997 | Brown et al. | ............ | 705/9 |
| 5,963,911 A * | 10/1999 | Walker et al. | ............ | 705/7 |
| 6,263,359 B1 * | 7/2001 | Fong et al. | ............ | 718/103 |
| 6,314,555 B1 * | 11/2001 | Ndumu et al. | ............ | 717/101 |
| 6,430,591 B1 * | 8/2002 | Goddard | ............ | 718/102 |
| 6,578,005 B1 * | 6/2003 | Lesaint et al. | ............ | 705/8 |
| 6,604,160 B1 * | 8/2003 | Le et al. | ............ | 710/240 |
| 6,973,359 B2 * | 12/2005 | Holtan et al. | ............ | 700/100 |
| 7,010,536 B1 * | 3/2006 | De Angelo | ............ | 707/100 |
| 7,093,250 B1 * | 8/2006 | Rector | ............ | 718/100 |
| 7,165,256 B2 * | 1/2007 | Boudnik et al. | ............ | 718/104 |
| 7,171,667 B2 * | 1/2007 | Libby | ............ | 718/104 |
| 7,203,942 B2 * | 4/2007 | Lafruit et al. | ............ | 718/100 |
| 2003/0037181 A1 * | 2/2003 | Freed | ............ | 709/328 |
| 2007/0094665 A1 * | 4/2007 | Jackson | ............ | 718/104 |

FOREIGN PATENT DOCUMENTS

EP          704796 A2 *   4/1996
WO     WO 01/84301 A2 *  11/2001

OTHER PUBLICATIONS

CPU reservations and time constraints: Efficient, predictable scheduling of independent activites, Jones et al, 1997, ACM, pp. 198-211.*
An algorithm for optimal project scheduling under multiple resource constraints, 1971, Management science, pp. B803-B816.*
Druschel et al., "The icecube approach to the reconciliation of divergent replicas", 2001, ACM, pp. 210-218.*

(Continued)

*Primary Examiner*—Meng-Ai An
*Assistant Examiner*—Caroline Arcos

(57) ABSTRACT

A method includes generating a cost associated with each of a plurality of tasks to be scheduled, and scheduling the minimum cost task if the minimum cost task successfully executes. Generating may include determining a pair-wise probability representing a probability that two tasks in the plurality of tasks conflict with each other. A system includes a cost generator generating costs associated with a plurality of tasks, the costs based on probabilities that each of the tasks influence the other tasks, and a scheduling engine operable to schedule the task with the least cost.

29 Claims, 7 Drawing Sheets

OTHER PUBLICATIONS

Barberet al., "Conflict detection during plan integration for multi-agent systems", 2001, IEEE, pp. 616-628.*

Preguica, Nuno; Shapiro, Marc; Matheson, Caroline; "Efficient Semantics-Aware Reconciliation for Optimistic Write Sharing"; Microsoft Corporation, May 2002; title + pp. 1-30.

Walker, A., Rizzo, J., Ojha, P.; "Empirical Study of Course Scheduling Methods" 2001 ACM International Studen Research Contest; Sep. 6, 2001; 19 pages.

* cited by examiner

FIG. 5

PROBABILISTIC SCHEDULING

TECHNICAL FIELD

The described subject matter relates to scheduling tasks. More particularly, the subject matter relates to scheduling based on probabilities associated with tasks.

BACKGROUND

Scheduling programs facilitate scheduling of tasks that require resources within given time periods. Typically, the scheduling program receives requests for resources needed for the tasks. The scheduling program then attempts to allocate limited resources to tasks that compete for those resources. Based on the allocation, the scheduling program schedules the tasks. For example, a scheduling program may have five conference rooms to assign among five meetings. The meetings may have constraints, such as number of attendees, minimum time duration, etc. Based on the constraints, the scheduling program chooses time slots and resources for the tasks.

Unfortunately, typical task scheduling problems are not as simple as allocating five conference rooms among five meetings. In a hospital setting, for example, there may be many types of medical rooms, staff, equipment, and the like, which can be allocated among hundreds of patients or medical operations, which may require resources in the alternative or in combinations. For example, a medical operation may require either resource "a" or "b" but not both, while another operation may require both resources "c" and "d." As the size and complexity of task scheduling problems increase, optimal solutions are more difficult to achieve, particularly in an efficient manner.

One task scheduling technique traditionally used is a "brute force" technique. The brute force technique involves representing all possible tasks and their resource requirement alternatives and combinations in a tree structure, and then analyzing every path in the tree to determine which path gives best results. For simple task scheduling problems, the brute force method may work satisfactorily; however, when the problem becomes complex, the tree structure becomes correspondingly complex, with countless alternative paths to be analyzed. The analysis of every path in such a complex tree structure can become NP (nondeterministic polynomial time) hard; i.e., computationally impractical. As a result, solving a complex task scheduling problem using brute force methods can be extremely inefficient and/or unworkable.

Other task scheduling algorithms apply heuristics that are not well founded. These algorithms often employ task scheduling rules that are not based on scientific or logical reasoning, but rather intuitive notions. One heuristic technique employs "greedy" heuristics in which the solution is constructed sequentially without regard for the effect that a resource allocation choice might have upon other requested tasks. Greedy algorithms are attractive due to their simplicity. While a greedy technique may yield optimal results sometimes, it can yield extremely sub-optimal results. As with other heuristic techniques, the success, or lack of success, of a greedy technique is typically haphazard.

SUMMARY

Implementations described and claimed herein solve the discussed problems, and other problems, by providing task scheduling methods and systems. Exemplary implementations may apply probabilities of influence to resource allocation, and may schedule tasks based on whether, and to what degree, the resource allocation influences a task.

A method includes generating a cost associated with each of a plurality of tasks to be scheduled, and scheduling the minimum cost task if the minimum cost task successfully executes. Generating may include determining a pair-wise probability representing a probability that two tasks in the plurality of tasks conflict with each other.

A system includes a cost generator generating costs associated with a plurality of tasks, the costs based on probabilities that a task influences another task, and a scheduling engine operable to schedule the task with the least cost.

BRIEF DESCRIPTION OF THE DRAWINGS

FIG. 5 illustrates a user interface that may be employed by a scheduling engine to receive scheduling input and present scheduling output.

DETAILED DESCRIPTION

Turning to the drawings, various methods are illustrated as being implemented in a suitable computing environment. Various exemplary methods are described in the general context of computer-executable instructions, such as program modules, being executed by a personal computer and/or other computing device. Generally, program modules include routines, programs, objects, components, data structures, etc. that perform particular tasks or implement particular abstract data types. Moreover, those skilled in the art will appreciate that various exemplary methods may be practiced with other computer system configurations, including hand-held devices, multi-processor systems, microprocessor based or programmable consumer electronics, network PCs, minicomputers, mainframe computers, and the like. Various exemplary methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Overview

Exemplary methods, systems, and devices are disclosed for probabilistic scheduling of tasks. In general, probabilistic scheduling may be applied to one or more tasks that require resources, a timeslot, and may that may have associated constraints. If two tasks require the same resources and timeslot, they conflict. Probabilistic scheduling involves minimizing a total schedule cost. The cost is a function of the excluded tasks. Cost is calculated from probability values associated with requested resources.

An Exemplary System for Probabilistically Scheduling Tasks

Figure 1:
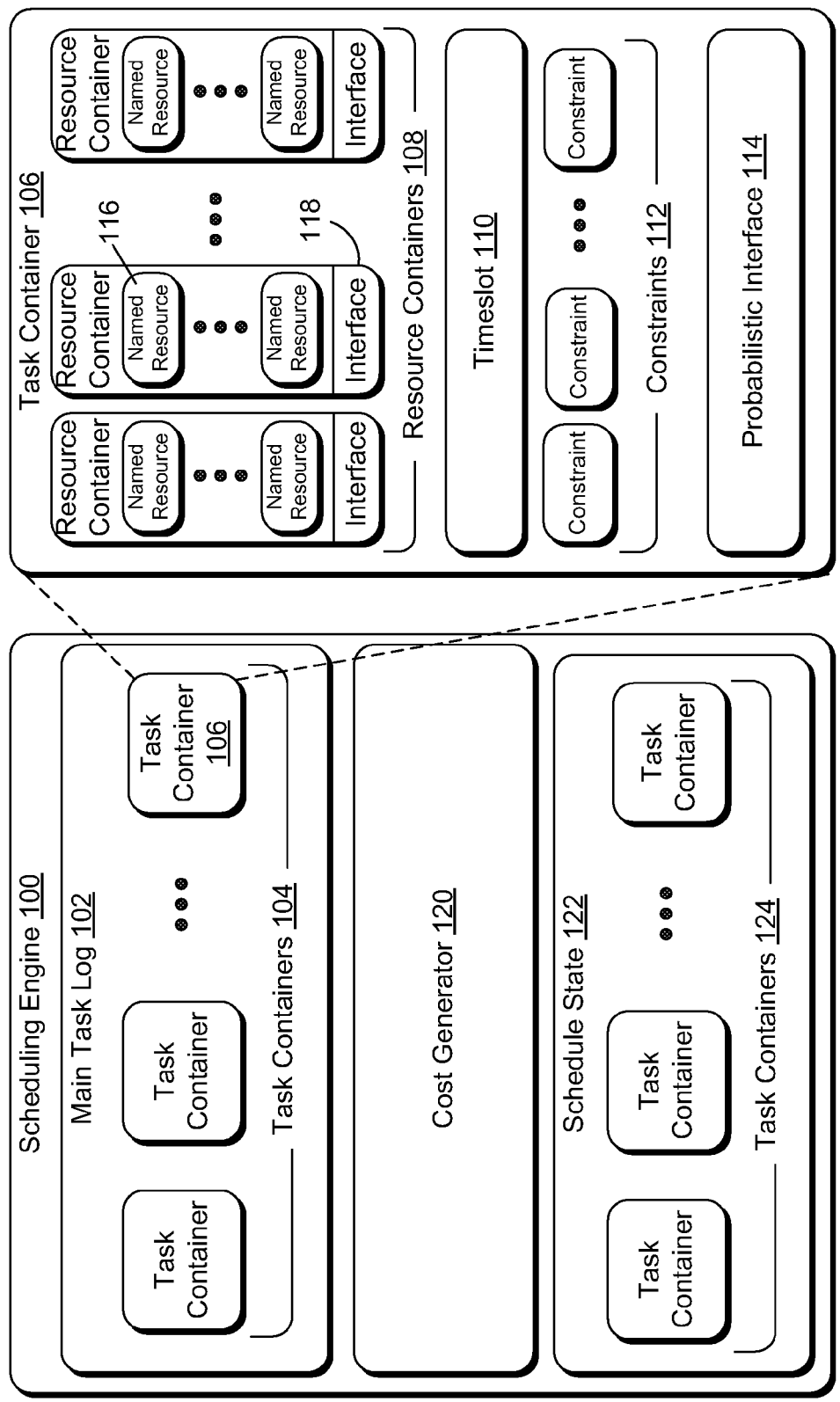
FIG. 1 illustrates an exemplary scheduling engine implementing operations for probabilistic scheduling of tasks.

FIG. 1 illustrates an exemplary scheduling engine 100 implementing operations for probabilistic scheduling of tasks. The scheduling engine 100 includes a main task log 102 that has a list of candidate task containers 104 representing tasks to be scheduled into a schedule state 122. The scheduling engine 100 uses a cost generator 120 to analyze the main task log 102 to determine which of the task containers 104 should be moved to the schedule state 122.

The main task log 102 may contain the task containers 104 or have a list of references (e.g., pointers) to the task containers 104. One of the task containers 104 is broken out to show components of an exemplary task container 106. The exemplary task container 106 includes one or more resource containers 108, a timeslot 110, one or more constraints 112, and an interface 114. As discussed further below, each resource container 108 includes one or more named resources 116 and defines selection criteria related to the named resources. The resource containers 108 may include other resource container, called sub-containers. Sub-containers may include yet other resource containers.

Each resource container 108 provides an interface 118 whereby functions can communicate with the resource container 108 to facilitate scheduling of the task 104. Each of the named resources 116 provides an interface (not shown) through which other containers can communicate with the named resource 116. More specifically, the named resource interface (not shown) and the resource container interface 118 include callable functions that enable a calling function to determine whether the named resource 116 or the resource container 108 influence (e.g., compete with, or support) a specified named resource or resource container. Exemplary types of resource containers are an 'OR' container, an 'AND' container, an 'XOR' container, and an 'Integer-Set' container, which are discussed in further detail below.

The timeslot 110 defines a timeslot in which the represented task is to occur. In one implementation, the timeslot 110 includes start time information, end time information, and duration information. The timeslot 110 may have an interface whereby modules can communicate with the timeslot 110 to facilitate scheduling of the represented task.

Each of the constraints 112 represents a time constraint between tasks represented by two of the task containers 104. In one implementation, each constraint 112 identifies another task container 104, and a time relationship between the task container 106 and the other task container 104. For example, a time relationship may indicate that the task represented by the task container 106 must occur two hours before another task represented by another task container 104. Constraints 112 are described in further detail below.

The scheduling engine 100 includes a cost generator 120 that communicates with the task containers 104 to generate costs associated with the tasks represented by the task containers 104. As used herein, the cost of a task is a numerical expression of the degree to which the task excludes or conflicts with another task. In one implementation, a total cost of a task is the sum of pair-wise costs associated with a pair of tasks. The costs can be calculated from probabilities that resources will or will not be allocated to a task. Calculating costs based on probabilities of resource allocation is discussed in further detail below.

A schedule state 122 provides the current state of the scheduled tasks. The schedule state 122 includes, or has a list of references to, the scheduled task containers 124 representing tasks that have been scheduled. During task scheduling, the schedule state 122 is used to determine whether candidate tasks 104 in the main task log 102 can be added to the schedule state 122.

In an implementation, the task containers 104, resource containers 108, and other modules shown in FIG. 1 are software objects or procedures that include data and methods that allow the scheduling engine 100 to schedule the tasks associated with the task containers 104.

Figure 2:
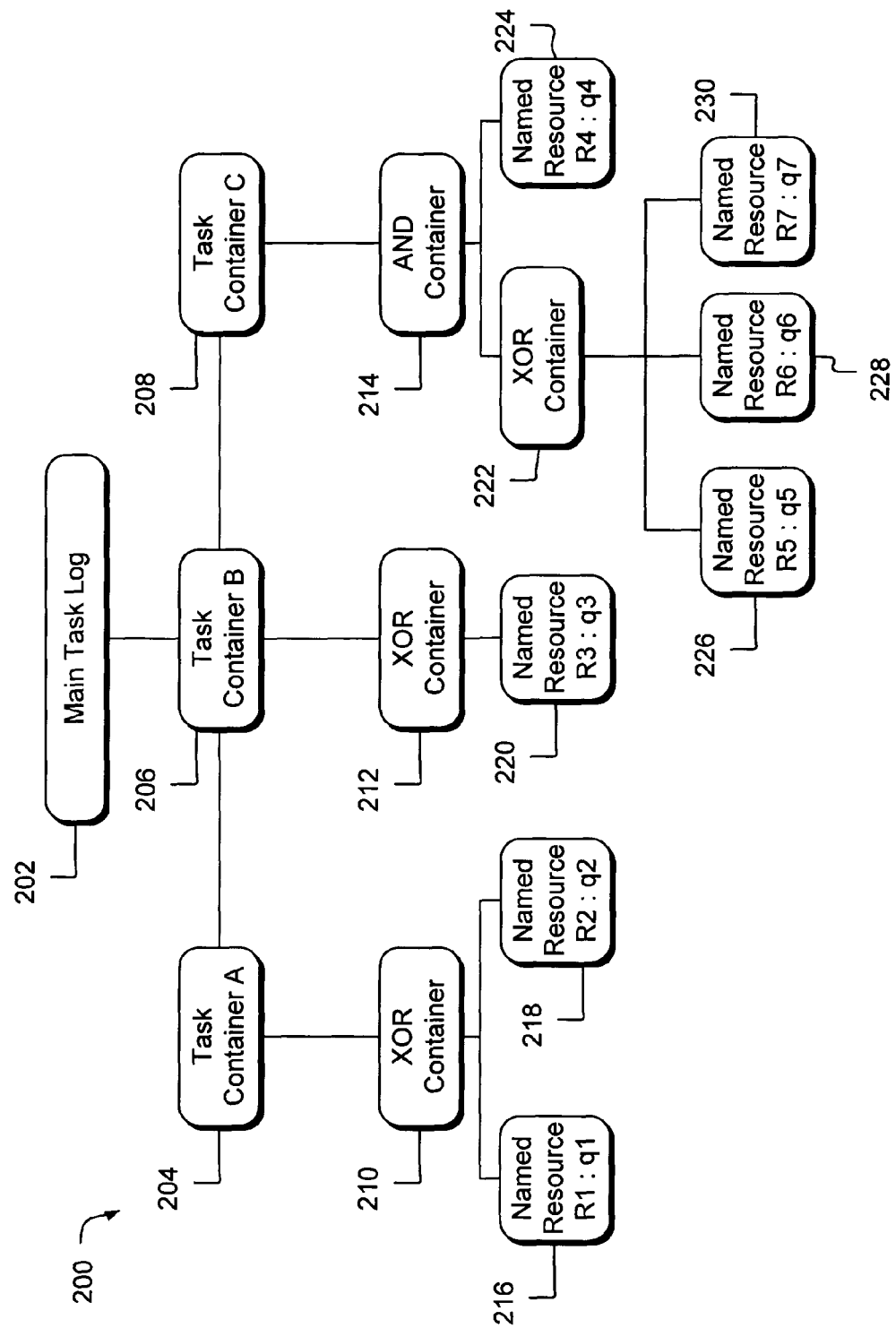
FIG. 2 is a hierarchical arrangement of a main task log, tasks, resource containers, and named resources.

FIG. 2 is a hierarchical arrangement of an exemplary main task log having tasks with resource containers, and named resources. The exemplary main task log 202 may be viewed as an inclusive "OR" container of a number of task containers 204, 206, and 208, meaning that the scheduling engine will attempt to schedule as many of the task containers 204, 206, and 208 as possible. The task containers 204, 206, and 208 are illustrated as nodes in the main task log 202. Below the task containers 204, 206, and 208 in the hierarchy are resource containers 210, 212, and 214, respectively.

The resource container 210 is an XOR container having named resource R1 (216) and named resource R2 (218). Thus, the XOR container 210 chooses either named resource R1 (216) or named resource R2 (218). Named resources, such as the named resource R1 (216) and the named resource R2 (218), have associated probabilities, q, that they will be selected. For example, the named resource R1 (216) has a probability of 'q1,' and the named resource R2 (218) has probability 'q2.' The probabilities, q, dictate the likelihood that a task will be excluded, and are used to generate costs associated with tasks.

To illustrate how probability values, q, may be used in probabilistic scheduling, exemplary values for 'q1' and 'q2' are described. In an implementation, 'q1' and 'q2' are assigned default values of 50%, meaning that they are both equally likely to be selected in the XOR container 210. In this or another implementation, the default values for 'q1' and 'q2' may be user-adjusted to make one of the named resources R1 (216) or R2 (218) more likely selected than the other. Thus, in this implementation, the user can express a preference for one resource over another. The values, 'q', may be referred to as probabilities, weights, or preference values herein.

As tasks get scheduled and resources are allocated to scheduled tasks, the probability values, q, can change because of dependencies among tasks and resources. For example, the probability 'q1' may start out as 50%, but if named resource R1 (216) is selected, the value 'q1' can be changed to 1 (i.e., 100%). Another named resource R3 (220) (discussed further below) has a default probability value, q3, of 1, because the resource R3 (220) is the only named resource in its container, resource container 212; however, if the named resource R3 (220) is the same as the named resource R1 (216), and the two resources are required simultaneously, the probability value q3 will be adjusted to 0 when the named resource R1 (216) is selected and scheduled. Thus, the probability values, q, are a function of the current schedule state. Probability values and how they are dynamically adjusted are discussed in further detail below.

The resource container 212 is an XOR container with only one named resource R3 (220). Thus, the named resource R3 (220) is required for the task 206. In another implementation, singly required resources, such as named resource R3 (220) need not be in an XOR container.

The resource container 214 is an AND container, meaning that the resource container chooses all of its components. As shown, the AND container 214 includes and XOR container 222 and a named resource R4 (224). The XOR container 222 has three named resources, named resource R5 (226), named resource R6 (228), and named resource R7 (230). The XOR container 222 selects one of the resources 226, 228, or 230. The AND container 214 then chooses both the resource selected by the XOR container 222 and the named resource R4 (224).

Throughout the description, reference is made to 'competition tables.' A competition table relates tasks using cost values. In one implementation, a pair-wise cost is generated for each pair of tasks. The total cost for a task is the sum of the pair-wise costs associated with the task. The pair-wise costs are generated based on the probability values, q. An exemplary competition table can be illustrated with reference to the hierarchy shown in FIG. 2.

Using the hierarchy of FIG. 2 as an example, assume that named resource R1 (216), named resource R3 (220), and named resource R5 (226) are all equal to resource 'a.' Further assume that named resource R2 (218), and named resource R6 (228) are both equal to resource 'b.' Also assume that named resource R7 (230) is equal to resource 'c' and that named resource R4 (224) is equal to resource 'd.' Assume also that no tasks have been scheduled. Thus, the schedule state is in the null state. Finally, assume that no preferences have been assigned to the probability values, q; i.e., within an XOR container, the 'q' values are equal. The foregoing assumptions may be expressed logically as follows:

| | |
|---|---|
| Task A: (a\|b) | (Task A requires 'a' xor 'b') |
| Task B: a | (Task B requires 'a') |
| Task C: (a\|b\|c) &d | (Task C requires 'a' xor 'b' xor 'c' and 'd') |

With the foregoing assumptions, the corresponding competition table is as shown in Table 1, referred to as the main competition table:

TABLE 1

| Main | Task A | Task B | Task C | Total Cost |
|---|---|---|---|---|
| Task A | 0 | 1/2 | 1/3 | 5/6 |
| Task B | 1/2 | 0 | 1/3 | 5/6 |
| Task C | 1/3 | 1/3 | 0 | 2/3 |

In Table 1, an intersection between column labeled with a task and a row labeled with a task is a pair-wise cost. In one implementation, the pair-wise cost between Task A and Task B is equal to the probability that Task A will exclude Task B. For example, the pair-wise cost of Task A and Task B is ½. The column labeled 'Total Cost' provides the total costs associated with each of the Tasks, A, B, and C. As shown, the minimum cost task is Task C.

A cost generator in the scheduling engine can generate task costs, such as those shown in the competition table, Table 1. The cost generator may also tabulate the costs as shown. To develop a competition table the cost generator queries the task containers iteratively for pair-wise probabilities that they compete with each other task container. For example, the cost generator can query the task container A 204 for the probability that the task container A 204 competes with task container B 206 and the probability that the task container A 204 competes with the task container C 208. The cost generator uses a probabilistic interface to the task containers 204, 206, and 208 to query the task containers 204, 206, and 208 in order to generate the pair-wise costs. Using the pair-wise costs, the cost generator can calculate the total costs associated with each task.

As discussed, resource and task containers provide a probabilistic interface to facilitate probabilistic scheduling. The following pseudocode function signatures comprise an exemplary probabilistic interface:

Probability competes(S, A):
Probability supports(S, A)
boolean on Select(S, A)
boolean on Exclude(S, A)
Probability prior(S)
boolean mutually_exclusive(A)
boolean overlap(A)
boolean precondition (S)
boolean execute(S),
boolean undo(S), wherein 'S' represents a schedule state and 'A' represents a container (e.g., task container, resource container) or a named resource.

A function call 'B.competes(S, A)' returns the probability that an input container or resource 'A' excludes the called container, 'B', given the schedule State 'S'. For example, if 'A' and 'B' need simultaneous access to unique resources 'a' or 'b' (exclusive 'OR', expressed as (a|b)) then the function call 'B.competes(S, A)' returns ½, assuming independence and a random selection of 'a' and 'b' for containers 'A' and 'B'. The reason that the probability is ½ in the previous example is because there is a ¼ probability that 'a' will be randomly selected for both 'A' and 'B' and a ¼ probability that 'b' will be randomly selected for both 'A' and 'B'.

Continuing with the example, using containers 'A,' and 'B,' state 'S,' and resource requirements (a|b), the function call 'B.competes(S, A)' returns a value different from ½ if the state 'S' already has one of the resources, 'a' and 'b,' allocated. For example, if the state already has resource 'b' allocated, then resource 'b' is not available for selection and allocation to either container 'A' or 'B'; therefore, in this particular illustration, the function call 'B.competes(S, A)' returns 1, meaning that container 'A' will exclude container 'B' if 'A' is chosen.

With regard to function 'supports( ),' a function call 'B.supports(S, A)' returns the probability that without container 'B', container 'A' will fail. For example, if container 'A' requires resources (a|b) (i.e., either resource 'a' or resource 'b', but not both), and container 'B' makes resource 'a' available, then the call 'B.supports(S, A) returns probability ½; i.e., there is a ½ probability that without container 'B,' container 'A' will be excluded.

The scheduling engine uses the above functions to determine whether a container and a named resource compete or support each other. For example, the scheduling engine can call 'B.competes(S, a)' to determine if selection and allocation of named resource 'a' excludes container 'B,' given state S. As another example, the scheduling engine can call 'B.supports(S, a)' to determine if exclusion of container 'B' excludes named resource 'a,' given state S.

Turning to the on Select( ) function, a function call 'B.on Select(S, A)' returns 'false' if the scheduling of 'A' excludes 'B' and returns 'true' otherwise. The function 'B.on Select(S, A)' is typically called when container 'A' overlaps with 'B,' and 'A' has been selected and executed successfully by the scheduling engine. The term 'overlapping' means that a container has some bearing on, and may influence, the success or failure of another action. Thus, container 'A' overlaps container 'B' because containers 'A' and 'B' have common members (e.g., resources), the selection of which may cause 'A' to exclude 'B' and vice versa. Overlap is discussed in further detail below.

Regarding the function 'onExclude( ),' a function call B.on Exclude(S, A) returns either 'true' or 'false' based on dependencies between container 'B' and container 'A.' The call B.on Exclude(S, A) returns 'false' if container 'B' is excluded when overlapping action 'A' has been excluded or has failed to execute, and returns 'true,' otherwise.

The function 'prior(S)' returns a probability that a container will succeed (i.e., be scheduled) given State S. For example, if in the state S resources 'a' and 'b' were previously allocated and container 'B' requires (a|b|c) (i.e., one and only one of resources 'a,' 'b,' and 'c'), the function call 'B.prior(S)' returns ⅓, assuming an independent random selection of resources 'a,' 'b,' and 'c'.

The function 'overlap(A)' returns 'true' if the called container or resource overlaps with container 'A.' For example, if container 'B' requires resources 'a' and 'b' (expressed as (a & b)) and 'A' requires resource 'a' simultaneously, then the call 'B.overlap(A)' returns 'true.'

The function 'preCondition(S)' estimates whether the container can be successfully executed given State S. B.preCondition(S) returns false if B will certainly fail in schedule state S, and true otherwise.

The function call 'B.execute(S)' attempts to execute container 'B' in the schedule 'S' and returns 'true' if 'B' is successfully executed; if 'B' cannot successfully execute, the function call returns 'false'. If the function B.execute(S) returns false, a function 'B.undo(S)' can be called to undo (i.e., reverse) side-effects that may have occurred during the failed attempt at execution. For example, the function B.undo(S) deallocates any resources that were allocated, or deschedules any tasks that were scheduled during the failed attempt at execution.

The function 'mutually_exclusive(a)' is provided by named resources as well as containers. The function 'mutually exclusive' returns an indication as to whether two resources or containers are mutually exclusive. For example, in one implementation, the function call 'b.mutually_exclusive(a)' returns 'true' if 'a' excludes 'b'. In another implementation, the function call 'b.mutually_exclusive(a)' returns a probability that 'a' excludes 'b.'

With regard to the probabilistic interface, the actual implementation of the interface functions varies depending on the type of container. Below, exemplary implementations of the 'competes( )' function are illustrated for the XOR container, the AND container, the OR container and the task container.

An XOR container, such as XOR containers 210, 212, and 222, is a resource container from which one, and no more than one resource is to be selected. Given a resource (i.e., a named resource or resource container), an XOR container determines the probability that the XOR container competes with the resource. The probability that an XOR container competes with a named resource 'a' is the sum over all the XOR container's member resources, 'c,' having probabilities '$q_c$' as shown in the expression below:

$$p(\text{XOR competes with } `a`) = \Sigma q_c \times c.\text{competes}(a),$$

The foregoing expression states that the probability that an XOR container competes with a single resource allocation, 'a', is equal to the sum of the probabilities, $q_c$, that the XOR container will use an option, 'c', times the probability that that option will exclude 'a'.

In one implementation, an XOR container maintains a competition sub-table that tabulates how each of its member resources competes with other tasks in the main task log. The competition sub-table is used to determine the cost of each selection and re-evaluate competition probabilities as resources are allocated to tasks and tasks are scheduled. Referring again to the above example, from which Table 1 was generated, an exemplary competition sub-table can be generated for the XOR containers 210, 212, and 214 (Tables 2, 3, and 4, respectively):

TABLE 2

| Task A | Task B | Task C | Total Cost |
|---|---|---|---|
| a | 1 | 1/3 | 4/3 |
| b | 0 | 1/3 | 1/3 |

TABLE 3

| Task B | Task A | Task C | Total Cost |
|---|---|---|---|
| a | 1/2 | 1/3 | 5/6 |

TABLE 4

| Task C | Task A | Task B | Total Cost |
|---|---|---|---|
| a | 1/2 | 1 | 3/2 |
| b | 1/2 | 0 | 1/2 |
| c | 0 | 0 | 0 |

In an implementation, XOR containers exclude any member resources whose pre-condition fails (i.e., any resource that cannot be selected because of the schedule state). In this implementation, when a pre-condition fails for such a resource, the associated XOR container assigns probability value of zero to the member resource whose pre-condition fails. If the user has not applied any preferences to the remaining member resources and the schedule state is the null state, equal probability values are applied to the XOR container's remaining member resources. Thereafter, selection probabilities are assigned on the basis of minimum cost, as discussed herein.

With regard to the pre-condition( ) function of an XOR container, in one implementation the XOR container pre-condition( ) function returns 'true' if any of the XOR container's member's pre-condition( ) functions return 'true.'

With regard to the execute( ) function of an XOR container, in one implementation, successful execution of any members of the XOR container results in returning 'true.' In response to receiving a call to 'execute( ),' an XOR container calls the execute( ) functions of the XOR container's members in order of least cost. If a call to an execute( ) function returns 'false' any side-effects (e.g., resource allocations, scheduled tasks, etc.) of the execution are reversed by calling the 'undo( )' function prior to calling the execute( ) function of the next container member. When one of the member's execute( ) function returns 'true,' the XOR container selects that member.

An AND container, such as the AND container 214, is a resource container for which all member resources or member containers are required for a task. For example, the AND container 214 requires both the XOR container 222 and the named resource R4 (224) in order for the task container 208 to be successfully scheduled.

Turning to the probabilistic interface for an AND container, the competes( ) function for an AND container returns the probability that an AND container excludes another container. The probability that container 'A' excludes an AND container is equal to one minus the probability that all members '$c_i$' of the AND container do not compete with 'A' (independence assumption). That is:

$$1-(1-c_1.\text{competes}(A))\times(1-c_2.\text{competes}(A))\times\ldots\times(1-c_i.\text{competes}(A)).$$

The 'pre-condition( )' function of an AND container returns true only if all the AND containers' member resources' pre-condition( ) functions return true. The 'execute( )' function in an AND container returns 'true' only if all members of the AND container execute successfully. AND containers contribute their own member resources to the competition table of any member containers because resource dependencies may exist between member containers of AND containers.

Turning now to an OR container, an OR container is a container that designates a selection of member resources such that at least 1 member is selected and the weight of selected members is maximized, given the current schedule state. If at least 1 member cannot be selected because all members are excluded by other tasks, the OR container will not be successfully scheduled. With regard to the competes( ) function as it pertains to an OR container, the probability that an OR container excludes another action, 'a', is the sum over all OR container members, 'c', of the viability of a member resource, 'c', times the probability that 'c' excludes 'a'. The competes( ) function for an OR container may be implemented as a simple iterative calculation.

Viability of a task represents the likelihood that the task will survive to the final schedule. The viability of a task depends on the availability of containers or resources. In turn, the viability of a task can influence the viability of other tasks that may use the same resources and containers. In one implementation of the scheduler, if a task 'A' uses a particular resource in a particular timeslot and has a high viability, another task 'B' that must use the same resource in the same time slot will have a low viability. For example, a task that excludes one other equally weighted task has a 50/50 viability. A task that requires an already allocated resource has 0 viability. A task of zero cost has viability 1.

In response to a call to the 'execute( )' function in an OR container, the OR container iteratively calls the execute( ) function of the OR container's members. In one implementation, the OR container maintains a competition sub-table that relates each member resource to the other tasks with a numerical cost value, as illustrated above. The OR container selects randomly between members of minimum cost and executes (or if necessary, excludes) each member until all members are processed.

A task container, such as the task container 204, the task container 206, and the task container 208, uses combinations of named resources, resource containers, timeslots, and constraints to represent a task. Named resources and resource containers are discussed above in detail. A timeslot, such as the timeslot 110 in FIG. 1, represents a time allocation of the associated task as a set of start-time choices with associated probabilities. A timeslot can be defined using notation [x-y-z], wherein 'x' represents the earliest possible time to start, 'y' represents the required duration, and 'z' represents the latest possible time to finish.

A timeslot can be implemented as an XOR container, wherein possible times for the timeslot are named resources discussed above. For example, if a task is defined as [1-2-5] (i.e., the timeslot requires two hours sometime between the hours of 1:00 and 5:00), the time periods 1:00-3:00, 2:00-4:00, and 3:00-5:00 can be grouped into an XOR container as named resources.

A first timeslot competes with a second time slot if any portion of a selected time period for the first timeslot overlaps with a portion of a selected time period for the second timeslot. The compete( ) function for a timeslot returns a probability much like an XOR container discussed above. For example, if a first timeslot is defined as [0-4-8], and a second timeslot is defined as [0-4-8], the probability that the first timeslot competes with the second time slot is 23/25.

A constraint, such as the constraints 112 in FIG. 1, represents any time-constraint between two tasks. A constraint may be implemented as an instance of a timeslot. In one implementation, one constraint excludes another constraint if the constraints have the same constraint-ID and according to the probability that one or both of the constraints will not be satisfied. Thus, for example, if two constraints have same constraint-ID, they might conflict, depending on what sort it is; otherwise, the two constraints will not conflict.

In one implementation, a constraint excludes the constraint's associated timeslot if constraint's time and the timeslot's time are not the same. To illustrate, assume Task A must follow Task B by more than two hours. Such a two hour time constraint can be implemented by two "constraint" actions added to both tasks which include a set of timeslots. These constraints exclude each other according to the probability that they will use conflicting timeslots, i.e., not within two hours. Also, the constraints will exclude their associated task's timeslot, according to the probability that the constraint needs a timeslot that the task can't have.

In one implementation, for a task to be viable, the task's required resources must be available, the task's timeslot must be available, and the task's constraints must be satisfied. The following expressions can be used to determine the viability of a task:

$$R = f(r_n), \text{ and} \tag{1}$$

$$V_{Task} = (c_1 \& c_2 \& c_3 \& \ldots \& c_i) \& (T|R), \tag{2}$$

where $f(r_n)$ represents a function of 'n' resources (e.g., XOR, AND, OR, or any combination thereof), R represents the viability of the resources '$r_n$', '$c_i$' is a Boolean indicator of whether the $i^{th}$ constraint is satisfied, and T is a Boolean indicator of whether an exclusive timeslot can be obtained.

Thus, equation (2) above indicates that the viability, $V_{Task}$, of a first Task is non-zero if all the constraints of the first Task are satisfied and either an exclusive timeslot, T, can be obtained, or an exclusive resource allocation, R, can be obtained. With regard to cost calculation as it relates to timeslot, T, and resource allocation, R, the probability that another task's timeslot excludes its own timeslot is multiplied by the probability that the task's resources exclude the task's resources, and vice versa.

Turning to the interface for a task container, the overlap( ) function, competes( ) function, precondition( ) function, and execute( ) function are described as follows in terms of the task container.

For task container B, the function call B.overlap(A) returns false if either the timeslot or resource requirements of container B do not overlap with the timeslot or resource requirements of container A.

For task container B, the function call B.competes(A) returns the probability that a constraint between A and B excludes the task container B plus the probability that B is not excluded by a constraint and a timeslot excludes B and a resource allocation excludes B. Thus, the function B.competes(A) can be expressed as follows:

$$c.competes(A)+((1-c.competes(A))\times(T.competes(A)\times R.competes(A)),$$

where 'c' represents a constraint container of B, T represents a timeslot container of B, and R represents a resource container of B.

For task container B, the function call B.precondition(S) returns true if at least one time period is available in schedule state S, which satisfies the timeslot container in B, and has the available resources that are required by task B. The function call B.precondition(S) may be viewed as the intersection of resource-free times in state S that satisfy both the B container's timeslot and resource requirements.

With regard to the execute(S) function for a task container, one implementation of the execute(S) function attempts to identify a time slot and resource allocation that intersect with available corresponding time slots and resources in state S. In this implementation, the execute(S) function randomly selects a minimum cost time slot. Resources required by the task container, but that are unavailable at the selected time slot, are assigned a viability of zero. For those resources that are available in the selected time slot, resources are selected according to minimum cost. If no consistent allocation is found, the selected time slot is assigned a viability of zero, and another time slot is randomly selected.

An alternative implementation of the execute(S) function for a task container involves the use of prior probabilities. In this implementation, prior viabilities of time slots associated with the task are iteratively multiplied by the probability that required resources are available during each time slot. A ratio is generated of resource viabilities of available resources to total possible resources. Resource viability is then recomputed according to the viability of the task's available timeslots; that is, ratio of viability of timeslots the task can use to total available timeslots.

Exemplary Operations for Probabilistically Scheduling Tasks

Figure 3:
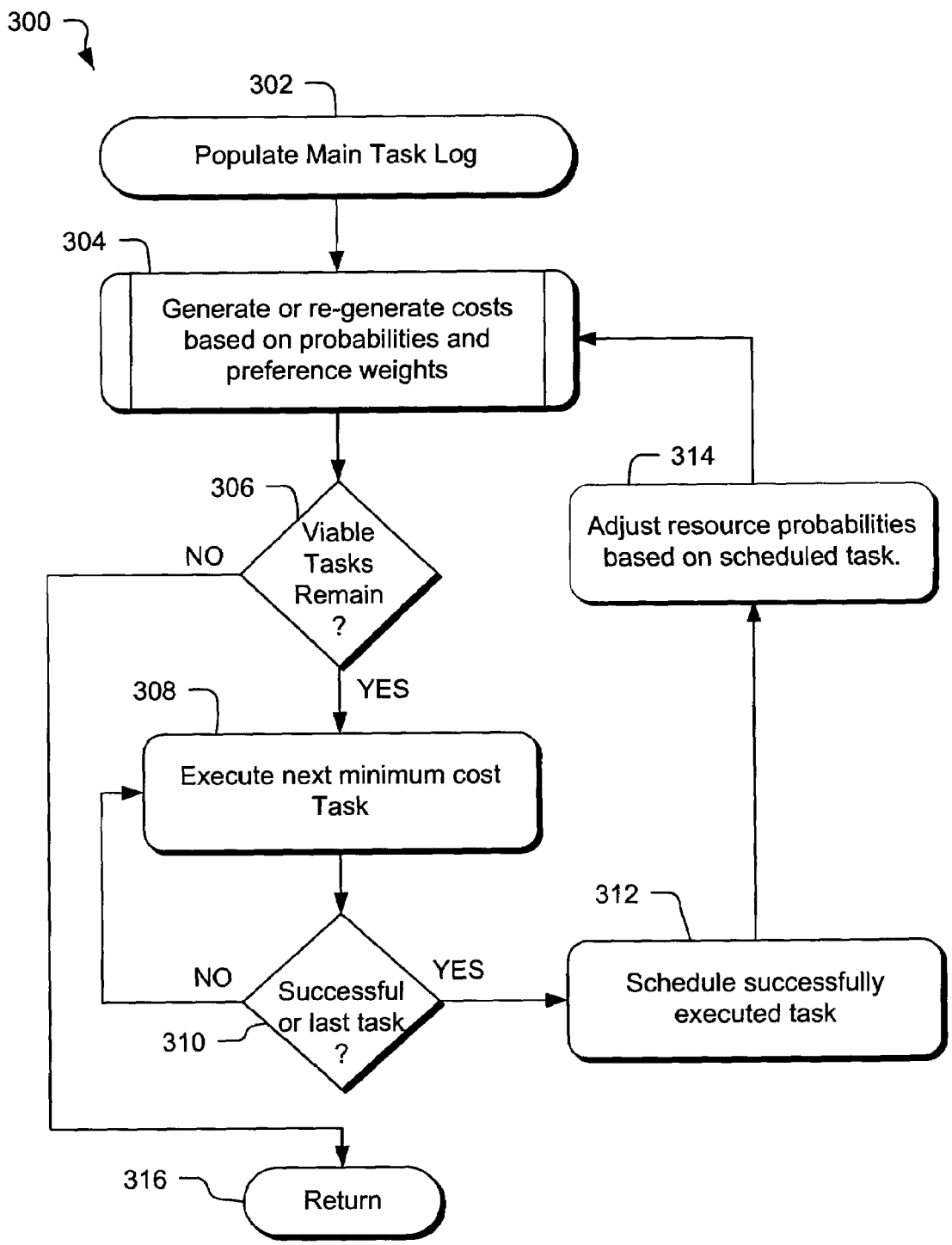
FIG. 3 is a scheduling operation flow having exemplary operations for probabilistically scheduling tasks.

FIG. 3 is a scheduling operation flow 300 having exemplary operations by which a scheduling engine (e.g., the scheduling engine 100, FIG. 1) may probabilistically schedule tasks. Upon entering the operation flow 300, a current scheduled state (e.g., the schedule state 122, FIG. 1) may have tasks currently scheduled. It is assumed that the current scheduled state is passed into the scheduling operation flow 300 or is otherwise available. In a populating operation 302, the main task log of the scheduling engine is populated with the tasks and their associated resource requirements, timeslots, constraints, and preference weights. The tasks in the main task log may be referred to as candidate tasks, which are being considered for scheduling.

Figure 4:
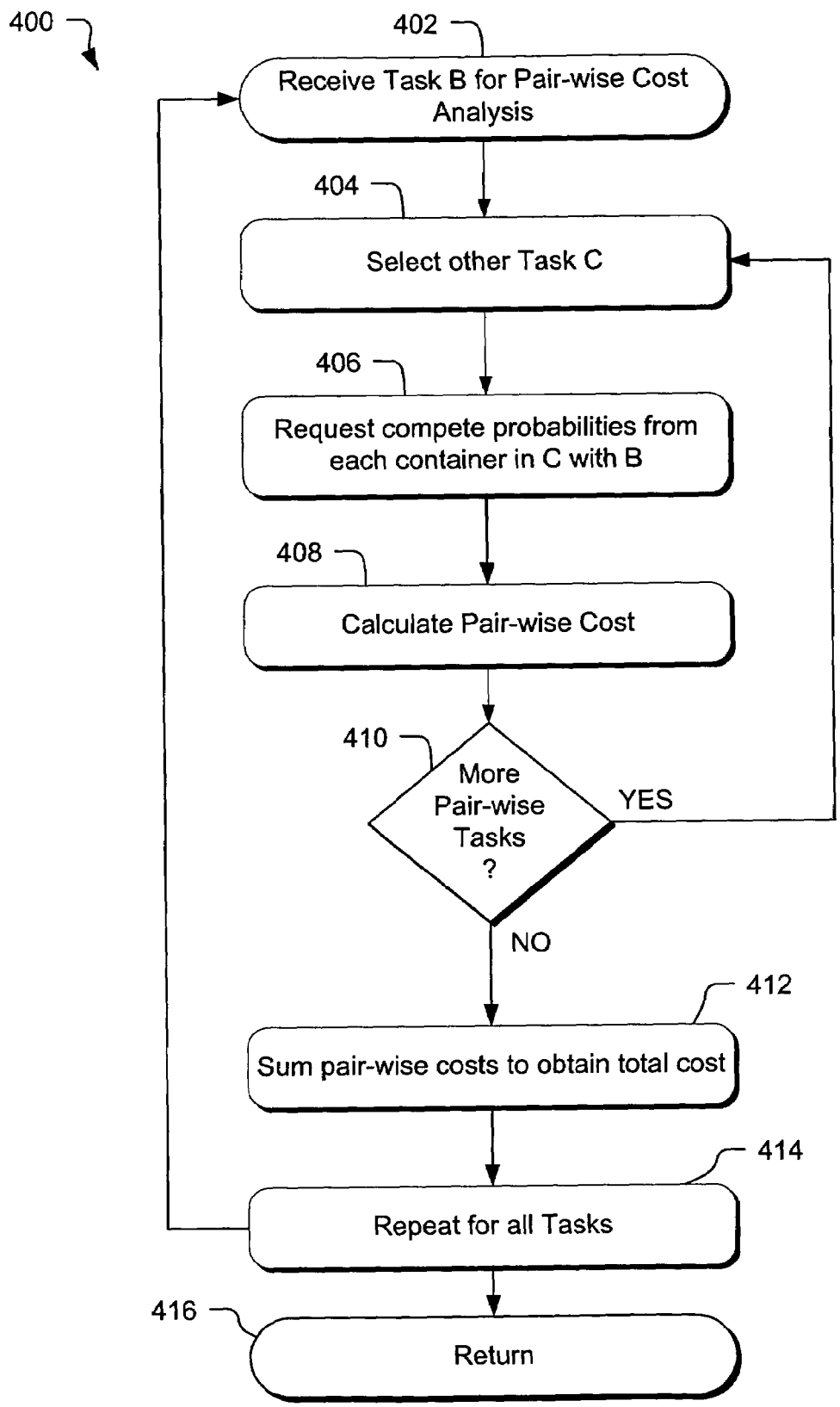
FIG. 4 is a cost tabulating operation flow having exemplary operations for generating costs associated with tasks.

A generating operation 304 generates costs associated with each of the candidate tasks. As discussed above, a cost of a candidate task represents numerically the degree to which the candidate task conflicts with and causes the exclusion of other candidate tasks. The costs generated in the generating operation 304 are a function of probabilities of selecting resources for each of the candidate tasks. An exemplary generating operation 304 is illustrated in FIG. 4 and is discussed in further detail below. The output of the generating operation 304 is a list of candidate tasks in order of least cost to highest cost.

A query operation 306 determines whether tasks in the main task log are viable with respect to the schedule state. Viability can be determined by calling the precondition( ) function of each task container in the main task log. The viability of a task is zero if the precondition( ) function returns false (i.e., zero probability of being scheduled). The viability is set to zero if call to the precondition( ) functions fail. If at least one call to the precondition( ) functions returns true then the query operation 306 branches 'YES' to an executing operation 308.

An executing operation 308 executes the least cost candidate task using the schedule state. The executing operation 308 calls the execute( ) operation of the least cost candidate task, which attempts to insert the least cost candidate task in the current schedule without any conflicts with previously scheduled tasks. One implementation of the executing operation 308 iterates through each of the scheduled tasks in the current schedule, and determines for each scheduled task whether the least cost candidate task requires the same resources in the same timeslot as the scheduled task, using the competes( ) functions of the task's member containers. If the least cost candidate task conflicts with one of the scheduled tasks, the executing operation is not successful. If the least cost candidate task does not conflict with any of the scheduled tasks, the executing operation is successful.

A query operation 310 determines whether the executing operation 310 was successful. If the executing operation 310 was not successful, the operation flow 300 branches "NO" back to the executing operation 310. Upon returning to the executing operation, the next least cost candidate task is executed with respect to the current schedule state as discussed above.

If it is determined in the query operation 310 that the executing operation 308 was successful, the operation flow branches 'YES' to a scheduling operation 312. The scheduling operation 312 schedules the successfully executed task into the current schedule and updates the current schedule state. In one implementation of the scheduling operation 312, the task container representing the scheduled task is moved into the current schedule state 122, FIG. 1. The scheduling operation 312 disables options that are not selected as a result of the scheduled task.

An adjusting operation 314 adjusts the resource probabilities (i.e., the 'q' values, discussed above) based on the scheduled task. An implementation of the adjusting operation 314 sets 'q' to zero for those resource containers that are no longer viable because of the scheduled task. The adjusting operation 314 may also set the 'q' value to 1 for those named resources and resource containers that were allocated to the scheduled task.

The generating operation 304 re-generates the costs of the task containers and resource containers based on the adjusted probabilities. As discussed above, the generating operation creates a main competition table that includes pair-wise costs relating every pair of tasks in the main task log and total costs. The generating operation 304 may generate other competition tables associated with resource containers that include costs for resource selections for each resource container. Re-generating the costs is the same procedure as discussed above, but the probabilities may be different on subsequent iterations. The query operation 306 again determines whether any viable tasks (i.e., any tasks whose probability of survival is non-zero) remain in the competition tables. If no viable tasks remain, the scheduling operation branches 'NO' to a return operation 316.

FIG. 4 is a cost generating operation flow 400 having exemplary operations for generating costs associated with tasks. A receiving operation 402 receives a task 'B' for pair-wise cost analysis with all other candidate tasks. A selecting operation 404 selects another task 'C' to create a pair of tasks for cost analysis. A requesting operation 406 requests probabilities that 'B' competes from each container in 'C.'

In the requesting operation 406, the compete(B) function is called for each container in 'C', as well as each sub-container, each sub-sub-container, and so on. For example, with reference to the exemplary hierarchy of FIG. 2, the requesting operation 406 calls compete(B) of the AND container 214, which calls the compete(B) function of the XOR container 222 and the compete(B) function of the named resource R4 (224). The results of the requesting operation are one or more probabilities that 'B' competes with containers in 'C'.

A calculating operation 408 calculates the pair-wise cost based on the probabilities obtained in the requesting operation 406. In one implementation, the pair-wise probability is the sum of all probabilities that 'B' will compete with each of the containers in 'C.' In another implementation of the calculating operation 408, the pair-wise cost is a function of the probability that 'B' competes with 'C'.

A query operation 410 determines whether any more tasks remain for pair-wise cost analysis with respect to task 'B'. If more tasks remain, the generating operation 400 branches 'YES' to the selecting operation 404, wherein the next task is selected for cost-analysis. If no more tasks remain, the generating operation 400 branches 'NO' to a repeating operation 412, wherein the generating operation 400 is repeated for a next task in the main log. After all pair-wise and total costs have been generated and tabulated by the generating operation 400, the generating operation 400 ends at a returning operation 414.

Exemplary Scenario

An example is provided below to illustrate how probabilistic scheduling may be employed with resource containers and using the 'minimum cost' criterion. Assume four tasks (A, B, C and D) each require some combination of resources a, b, and c as follows:

| | |
|---|---|
| A: (a\|c) | A requires a or c (XOR) |
| B: (b\|c) | B requires b or c (XOR) |
| C: (c) | C requires c (XOR) |
| D: (a &b) | D requires a and b (AND) |

Tasks A, B, C, and D are all part of the main task log. From a null schedule state (i.e., no tasks scheduled), each task is initially assumed equally 'viable' (prob. of survival equal 1) and each option (e.g., a or b) is assigned equal probability. Competition tables are generated with pair-wise costs, $X_{ij}$ (probability that i excludes j), as shown in Table 5:

TABLE 5

| Main | A | B | C | D | Total Cost | Viability |
|---|---|---|---|---|---|---|
| A | 0 | 1/4 | 1/2 | 1/2 | 5/4 | 4/9 |
| B | 1/4 | 0 | 1/2 | 1/2 | 5/4 | 4/9 |

TABLE 5-continued

| Main | A | B | C | D | Total Cost | Viability |
|---|---|---|---|---|---|---|
| C | 1/2 | 1/2 | 0 | 0 | 1 | 1/2 |
| D | 1/2 | 1/2 | 0 | 0 | 1 | 1/2 |

That is to say, the probability $X_{AB}$ that A excludes B is ½ (A chooses c)×½ (B chooses c)=¼, and so on. Viability is calculated as 1/(1+TotalCost).

Competition sub-table for each of the XOR container actions, A and B, are generated as shown in Tables 6 and 7 below:

TABLE 6

| A | B | C | D | Total Cost | Viability |
|---|---|---|---|---|---|
| a | 0 | 0 | 1 | 1 | 1/2 |
| c | 1/2 | 1 | 0 | 3/2 | 2/5 |

TABLE 7

| B | A | C | D | Total Cost | Viability |
|---|---|---|---|---|---|
| b | 0 | 0 | 1 | 1 | 1/2 |
| c | 1/2 | 1 | 0 | 3/2 | 2/5 | where the 'Total Cost' column (expected weight of viable resources excluded) is computed by adding up each exclusion probability times the probability that this resource is viable. This probability is initially set equal to the resource's prior probability minus 1 for the null state.

The 'viability' column is computed for Table 5 (each probability that a task survives potential competitors). Entries in the MAIN table (Table 5) are then used to re-compute costs for each of the sub-tables (Table 6 and Table 7). The XOR sub-tables re-adjust their internal probabilities to select between tasks of minimum cost, which changes the $X_{nk}$. Viabilities are re-computed, and so on, until no further changes are made. Scheduling tasks from the MAIN table (Table 5) involves selecting arbitrarily between its minimum cost tasks, testing the pre-condition of the selected task and executing the task.

In this example, C and D start off as the most viable tasks. A and B select resources a and b respectively as their minimum cost options, and after 2 steps, the iteration ends with the resource selections shown below in Tables 8, 9, and 10:

TABLE 8

| A | B | C | D |
|---|---|---|---|
| a | 0 | 0 | 1 |
| c | 0 | 1 | 0 |

TABLE 9

| B | A | C | D |
|---|---|---|---|
| b | 0 | 0 | 1 |
| c | 0 | 1 | 0 |

TABLE 10

| Main | A | B | C | D |
|------|---|---|---|---|
| A | 0 | 0 | 0 | 1 |
| B | 0 | 0 | 0 | 1 |
| C | 0 | 0 | 0 | 0 |
| D | 1 | 1 | 0 | 0 |

Exemplary User Interfaces to Facilitate Probabilistic Scheduling of Tasks

Figure 5:
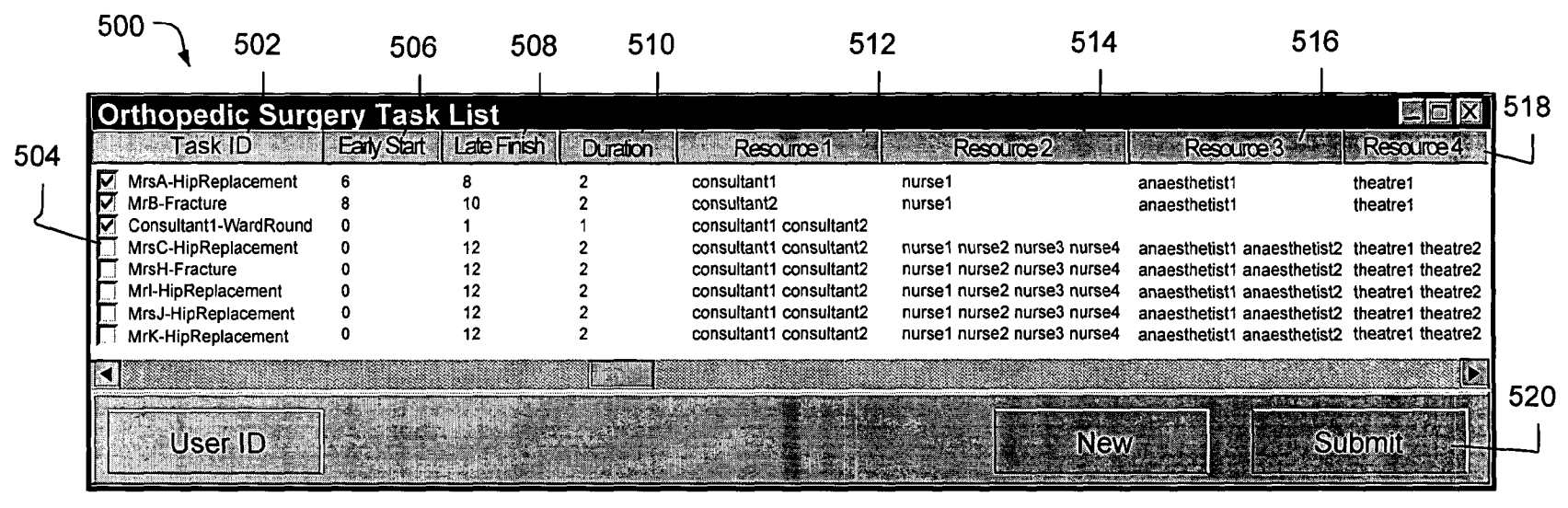

FIG. 5 illustrates a user interface 500 that may be employed by a scheduling engine (e.g., scheduling engine 100, FIG. 1) to receive scheduling input and present scheduling output. The exemplary user interface 500 is designed for an orthopedic surgery setting, in which nurses, consultants, anaesthetists, and operating room theatres are resources to be allocated to a number of patients requiring operations.

A task ID column 502 is a list of patients who require various operations. Check boxes 504 indicate which of the tasks in the column 502 have been scheduled, and which have not. In an early start column 506 a user can enter the earliest possible start time for an associated task. Thus, the MrK-HipReplacement cannot start before time '0'. A late finish column 508 provides the latest possible finish time for an associated task. A duration column 510 provides the duration of the task. The early start times, late finish times, and duration, collectively define a timeslot that can be used to probabilistically schedule the tasks in the task ID column 502 using methods discussed above.

A resource 1 column 512 lists consultant requirements for associated tasks. The MrI-HipReplacement can use either consultant1 or consultant2 (i.e., XOR). A resource 2 column 514 lists nurse requirements for associated tasks. The MrI-HipReplacement can use nurse1, nurse2, nurse3, or nurse4 (i.e., XOR). A resource 3 column 516 lists anaesthetist requirements for associated tasks. The MrI-HipReplacement can use anaesthetist1, or anaesthetist2 (i.e., XOR). A resource4 column 518 lists theatre requirements for associated tasks. The MrI-HipReplacement can use theatre1, or theatre2 (i.e., XOR). After a user has entered in the resource requirements and timeslot specifications, the user can select a submit button 520 to cause a scheduling engine to schedule the tasks.

Figure 6:
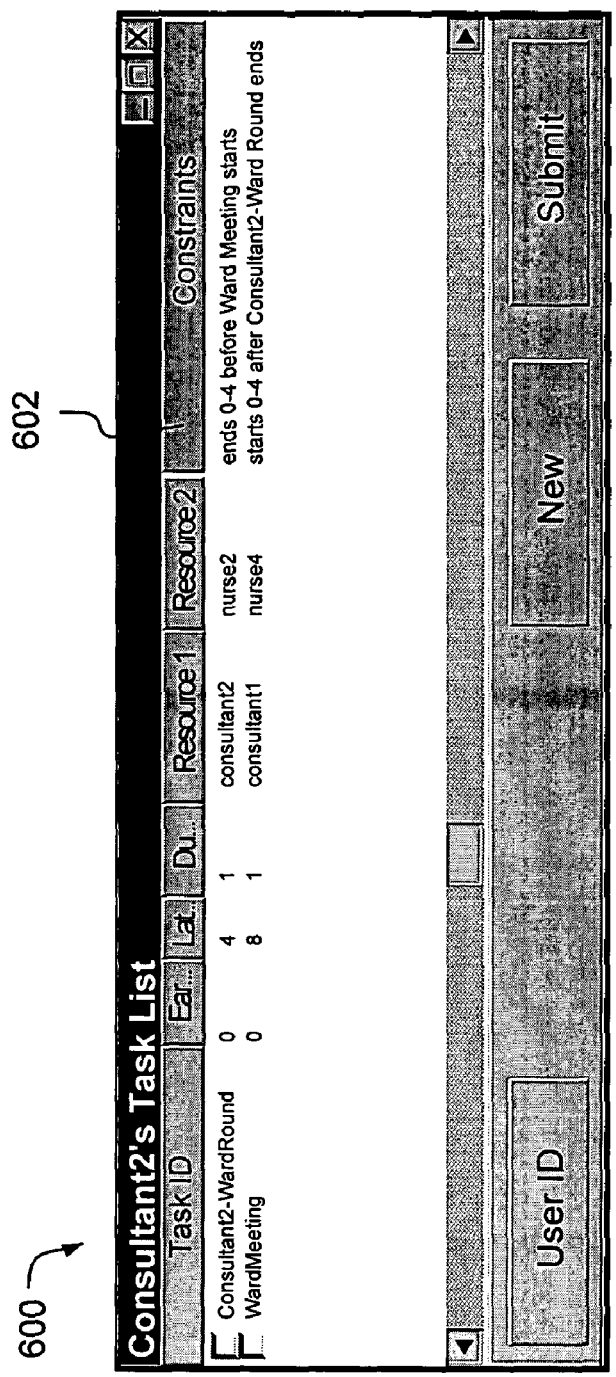
FIG. 6 illustrates another user interface that may be employed by a scheduling engine to receive scheduling input including constraints.

FIG. 6 illustrates another user interface 600 that may be employed by a scheduling engine to receive scheduling input including constraints. Like the user interface of FIG. 5, the user interface 600 includes a list of tasks, early start time, late finish time, and duration, and resources. The user interface 600 also provides a constraints entry area 602, into which a user can enter constraints. As shown, the constraints are specified in terms of a temporal relationship between two tasks. Thus, as shown, the Consultant2-WardRound is to end 0 to 4 time units before the Ward Meeting starts. Constraints from the constraints entry area 602 can be incorporated into constraint containers as discussed above for probabilistically scheduling tasks.

An Exemplary Operating Environment

Figure 7:
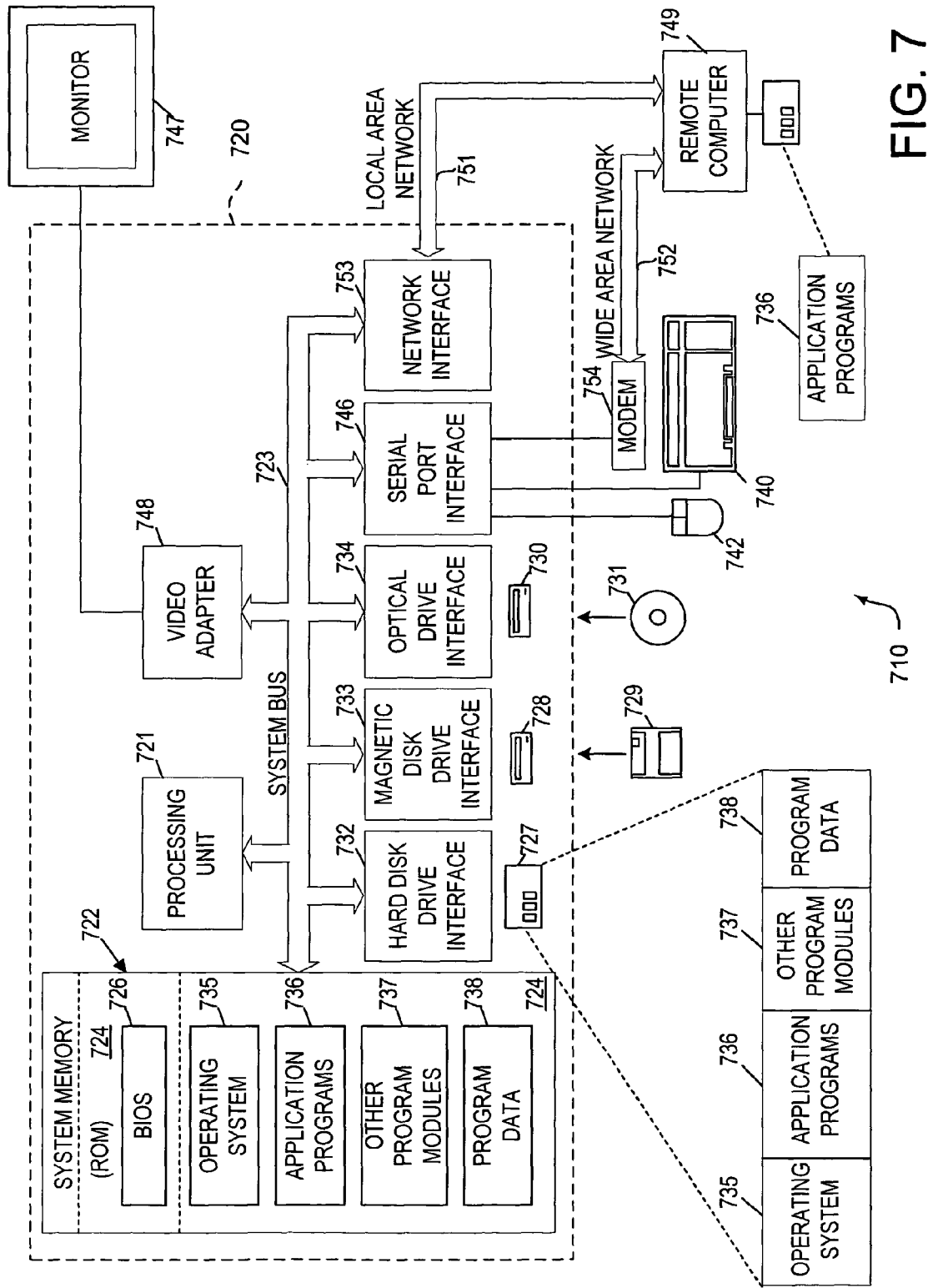
FIG. 7 illustrates an exemplary system that provides a suitable operating environment to schedule tasks in accordance with the systems, methods, and user interfaces described in FIGS. 1-6.

FIG. 7 illustrates one operating environment 710 in which the various systems, methods, and data structures described herein may be implemented. The exemplary operating environment 710 of FIG. 7 includes a general purpose computing device in the form of a computer 720, including a processing unit 721, a system memory 722, and a system bus 723 that operatively couples various system components include the system memory to the processing unit 721. There may be only one or there may be more than one processing unit 721, such that the processor of computer 720 comprises a single central-processing unit (CPU), or a plurality of processing units, commonly referred to as a parallel processing environment. The computer 720 may be a conventional computer, a distributed computer, or any other type of computer.

The system bus 723 may be any of several types of bus structures including a memory bus or memory controller, a peripheral bus, and a local bus using any of a variety of bus architectures. The system memory may also be referred to as simply the memory, and includes read only memory (ROM) 724 and random access memory (RAM) 725. A basic input/output system (BIOS) 726, containing the basic routines that help to transfer information between elements within the computer 720, such as during start-up, is stored in ROM 724. The computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media.

The hard disk drive 727, magnetic disk drive 728, and optical disk drive 730 are connected to the system bus 723 by a hard disk drive interface 732, a magnetic disk drive interface 733, and an optical disk drive interface 734, respectively. The drives and their associated computer-readable media provide nonvolatile storage of computer-readable instructions, data structures, program modules and other data for the computer 720. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 729, optical disk 731, ROM 724, or RAM 725, including an operating system 735, one or more application programs 736, other program modules 737, and program data 738. At least one of the application programs 736 is a scheduling application operable to control scheduling of events or tasks that have resource requirements.

A user may enter commands and information into the personal computer 720 through input devices such as a keyboard 740 and pointing device 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port, or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as remote computer 749. These logical connections may be achieved by a communication device coupled to or a part of the computer 720, or in other manners. The remote computer 749 may be another computer, a server, a router, a network PC, a client, a peer device or other common network node, and typically includes many or all of the elements described above relative to the computer 720, although only a memory storage device 750 has been illustrated in FIG. 7. The logical connections depicted in FIG. 7 include a local-area network (LAN) 751 and a wide-area network (WAN) 752.

The LAN 751 and/or the WAN 752 can be wired networks, wireless networks, or any combination of wired or wireless networks. Such networking environments are commonplace in office networks, enterprise-wide computer networks, intranets and the Internal, which are all types of networks.

When used in a LAN-networking environment, the computer 720 is connected to the local network 751 through a network interface or adapter 753, which is one type of communications device. When used in a WAN-networking environment, the computer 720 typically includes a modem 754, a type of communications device, or any other type of communications device for establishing communications over the wide area network 752. The modem 754, which may be internal or external, is connected to the system bus 723 via the serial port interface 746. In a networked environment, program modules depicted relative to the personal computer 720, or portions thereof, may be stored in the remote memory storage device. It is appreciated that the network connections shown are exemplary and other means of and communications devices for establishing a communications link between the computers may be used.

Although some exemplary methods, devices and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

We claim:

1. A computer-implemented method comprising:
   receiving a plurality of task containers, each said task container representing a task to be scheduled at a computer, where each said task container includes a grouping of a plurality of resources containers, wherein each said resource container includes resource information that specifies one or more resources required for the represented task and selection criteria to select from the one or more resources, and wherein each said task container further includes an interface function that, when called, determines a pair-wise probability that the task represented by another task container will influence the task represented by the called task container based on a current schedule state of scheduled tasks, selection criteria specified in resource containers of the another task container, and selection criteria specified in resource containers of the called task container;
   generating a total cost for each task based on pair-wise costs for each task calculated from determined pair-wise probabilities that the task will influence each other task in the plurality of task containers; and
   scheduling the task with the least total cost.

2. A method as recited in claim 1 wherein the each selection criteria specifies a relationship selected from a group consisting of:
   an "AND" relationship indicating that all of a plurality of the resources are required to complete the represented task;
   an "XOR" relationship indicating that only one of the one or more resources is required to complete the represented task; and
   an "OR" relationship indicating that one or more of the resources are required to complete the represented task.

3. A method as recited in claim 1 further comprising:
   receiving a timeslot definition associated with each of the plurality of tasks or resources, the timeslot definition defining a required timeslot for the associated task or resource.

4. A method as recited in claim 3 wherein the timeslot definition comprises an early start indicator, a late finish indicator, and a duration indicator.

5. A method as recited in claim 1 further comprising:
   receiving a constraint describing a time constraint between two tasks in the plurality of tasks; and
   scheduling the two tasks based on the constraint.

6. A method as recited in claim 1 further comprising:
   determining the pair-wise probability for a pair of tasks that a first task in the pair of tasks influences a second task in the pair of tasks based on the resource information; and
   adjusting the pair-wise cost of the pair of tasks based on a function of the pair-wise probability that the first task in the pair of tasks influences the second task in the pair of tasks.

7. A method as recited in claim 1 further comprising:
   determining the pair-wise probability for a pair of tasks that a first task in the pair of tasks supports a second task in the pair of tasks based on the resource information; and
   if the first task supports the second task, reducing the pair-wise cost of the pair of tasks based on a function of the pair-wise probability that the first task supports the second task.

8. A method as recited in claim 1 further comprising:
   determining the pair-wise probability for a pair of tasks that a first task in the pair of tasks competes with a second task in the pair of tasks based on the resource information; and
   if the first task competes with the second task, increasing the pair-wise cost of the pair of tasks based on a function of the pair-wise probability that the first task competes with the second task.

9. A method as recited in claim 1 wherein the generating comprises:
   selecting a first task from among the plurality of tasks;
   querying the task container of the first task for the pair-wise probabilities; and
   summing the pair-wise probabilities to form the total cost associated with the first task.

10. A method as recited in claim 1 wherein the resource information comprises preference information describing preferences of the one or more resources.

11. A method as recited in claim 1 wherein the generating comprises applying preference values to the tasks.

12. A method as recited in claim 1 wherein the generating comprises tabulating the pair-wise cost associated with each pair of tasks.

13. A method as recited in claim 1 further comprising:
    removing the scheduled task from a main task log;
    adjusting pair-wise probabilities associated with resources remaining in the main task log based on the scheduled task; and
    re-generating the total cost for each task based on pair-wise costs for each task calculated from adjusted pair-wise probabilities that the task will influence each other task in the plurality of tasks task containers.

14. A computer-readable storage medium storing processor-executable instructions for performing a method comprising:
    receiving a plurality of first resource identifiers identifying first resources associated with a first candidate task and selection criteria defining how the first resources are to be selected from the plurality of first resources;
    receiving a second resource identifier identifying a second resource associated with a second candidate task;
    receiving a current schedule state of scheduled tasks and scheduled resources;

querying a task container that includes an interface function that, when called, determines a pair-wise probability that the first candidate task will influence the second candidate task based on the current schedule state of scheduled tasks, the first resources, the second resource, and the selection criteria;

calculating a pair-wise cost of scheduling the first candidate task based on the determined pair-wise probability; and scheduling one or more of the first candidate task and the second candidate task based on the pair-wise cost.

15. A computer-readable storage medium as recited in claim 14 wherein the scheduling comprises:

identifying one or more of the first resources that are not the same as the second resource and that satisfy the selection criteria.

16. A computer-readable storage medium as recited in claim 14 further comprising:

determining whether the first candidate task and the second candidate task are viable based on the current schedule state; and eliminating one or more of the first or second candidate task from consideration if the one or more of the first or second candidate task is not viable.

17. A system for scheduling a plurality of tasks, the system comprising:

a processor;

a task log including a plurality of task objects, each said task object representing a task to be scheduled, each said task object having resource objects, each said resource object representing a resource that is selectable for the associated task according to resource selection logic, and wherein each said task object further includes an interface function that, when called, determines a pair-wise probability that another task represented by another task object will influence the task represented by said called task object, said determination based on a current schedule state of scheduled tasks, resource selection logic associated with said another task object, and resource selection logic associated with said called task object;

a cost generator operable to generate a total cost for each of the tasks based on pair-wise costs for each task calculated from determined pair-wise probabilities that each said task will influence each other said task; and a scheduling engine operable to schedule the task with the least total cost.

18. A system as recited in claim 17 wherein the resource selection logic is selected from a group consisting of:

an "AND" function indicating that all of the plurality of resources are required;

an "XOR" function indicating that one and only one of the plurality of resources is required; and an "OR" function indicating that at least one of the plurality of resources is required.

19. A system as recited in claim 17 wherein the cost generator is further operable to calculate the pair-wise costs associated with each of the tasks.

20. A system as recited in claim 17 wherein the cost generator is further operable to tabulate the pair-wise costs associated with each of the tasks.

21. A system as recited in claim 17 wherein the task object further comprises time constraint information indicating at least one time constraint between two of the tasks.

22. A system as recited in claim 17 wherein the task log further comprises a hierarchical arrangement of the task objects and the resource objects.

23. A system as recited in claim 17 wherein each task object is operable to return a pair-wise probability that the task object competes with another task object.

24. A computer implemented method comprising:

determining pair-wise probabilities for a plurality of tasks to be scheduled at a computer that each task in a plurality of tasks will influence each other task in the plurality of tasks;

calculating pair-wise costs associated with the plurality of tasks from determined pair-wise probabilities for the plurality of tasks;

generating a total cost associated with each of a the plurality of tasks to be scheduled based on the pair-wise costs for each task, wherein each task requires one or more resources, and wherein at least one of the tasks requires a plurality of resources, and wherein generating the total cost of the at least one task is based on pair-wise costs for the at least one task calculated from determined pair-wise probabilities that other tasks require one or more of the plurality of resources required by the at least one task;

executing a minimum total cost task including allocating resources to the minimum total cost task;

scheduling the minimum total cost task if the minimum total cost task successfully executes; and reversing side-effects from the executing including deallocating resources from the minimum total cost task if the minimum total cost task fails to execute.

25. A method as recited in claim 24 further comprising determining a pair-wise probability representing a probability that a first task in the plurality of tasks conflicts with a second task in the plurality of tasks.

26. A method as recited in claim 25 further comprising adjusting the pair-wise probability in response to scheduling the minimum total cost task.

27. A method as recited in claim 24 further comprising determining the total costs based upon preference weights assigned to the plurality of tasks.

28. A method as recited in claim 24 further comprising determining viability of each task in the plurality of tasks.

29. A method as recited in claim 24, wherein reversing side-effects comprises deallocating any resources allocated during the executing and de-scheduling any tasks that were scheduled during the executing.

* * * * *

UNITED STATES PATENT AND TRADEMARK OFFICE
CERTIFICATE OF CORRECTION

| | | |
|---|---|---|
| PATENT NO. | : 7,516,455 B2 | |
| APPLICATION NO. | : 10/656355 | |
| DATED | : April 7, 2009 | |
| INVENTOR(S) | : Elizabeth Matheson et al. | |

It is certified that error appears in the above-identified patent and that said Letters Patent is hereby corrected as shown below:

In column 18, line 56, in Claim 13, after "of" delete "tasks".

In column 20, line 24, in Claim 24, before "the" delete "a".

Signed and Sealed this

Third Day of May, 2011

David J. Kappos
*Director of the United States Patent and Trademark Office*